United States Patent [19]

Nakano

[11] Patent Number: 4,691,131
[45] Date of Patent: Sep. 1, 1987

[54] STATOR LAMINATE IMPREGNATION IN A LIQUID-COOLED MOTOR

[75] Inventor: Jiro Nakano, Hino, Japan

[73] Assignee: Fanuc Ltd., Yamanashi, Japan

[21] Appl. No.: 882,981

[22] PCT Filed: Nov. 13, 1985

[86] PCT No.: PCT/JP85/00633
§ 371 Date: Jun. 30, 1986
§ 102(e) Date: Jun. 30, 1986

[87] PCT Pub. No.: WO86/03068
PCT Pub. Date: May 22, 1986

[30] Foreign Application Priority Data

Nov. 14, 1984 [JP] Japan .............. 59-238588

[51] Int. Cl.$^4$ ............................. H02K 9/193
[52] U.S. Cl. ................... 310/54; 310/60 A; 310/259
[58] Field of Search .............. 29/596; 165/174; 310/45, 54, 59, 60 A, 61, 216, 254, 43, 259

[56] References Cited

U.S. PATENT DOCUMENTS

| 1,451,577 | 4/1923 | Jantzen | 310/54 |
| 1,959,527 | 5/1934 | Ehrmann | 310/54 |
| 3,322,985 | 5/1967 | Azbukin et al. | 310/61 |
| 4,085,347 | 4/1978 | Lichius | 310/42 |
| 4,323,803 | 4/1982 | Danko et al. | 310/59 |
| 4,406,959 | 9/1983 | Harano et al. | 310/61 |

FOREIGN PATENT DOCUMENTS

| 691563 | 10/1930 | France | 310/54 |
| 47-18006 | 10/1972 | Japan . | |
| 56-53557 | 5/1981 | Japan . | |

Primary Examiner—Patrick R. Salce
Assistant Examiner—D. L. Rebsch
Attorney, Agent, or Firm—Armstrong, Nikaido, Marmelstein & Kubovcik

[57] ABSTRACT

A liquid-cooled motor with cooling liquid passages (20a to 20d, 22a to 22d) formed in the laminated core (18) of a stator (16) fixedly disposed so as to surround a rotor (14). A plurality of the cooling liquid passages (20a to 22d, 22a to 22d) are formed so as to extend axially, and are distributed symmetrically with respect to the axis of the motor (10) as viewed in cross section of the laminated core (18) perpendicular to the axis. Spaces between the laminations are impregnated with resin to prevent leakage of the cooling fluid.

3 Claims, 3 Drawing Figures

1

STATOR LAMINATE IMPREGNATION IN A LIQUID-COOLED MOTOR

TECHNICAL FIELD

The present invention relates to a liquid-cooled AC motor comprising a stator having a laminated core having coils inserted therein and provided with passages for passing a cooling liquid therethrough to cool the stator directly with the cooling liquid and, more particularly, to an improved liquid-cooled motor capable of preventing thermal distortion of the stator.

BACKGROUND ART

The stator of an AC motor comprises a laminated core mounted with coils, and heat is generated in the stator due to iron loss and copper loss, which has a serious adverse influence on the useful life and performance of the motor. To obviate this adverse influence of the heat generated in the stator on the useful life and performance of the AC motor, methods of removing heat from the stator by circulating cooling air through the laminated core (for example, U.S. Pat. No. 4,534,686) and methods of removing heat from the stator by circulating a cooling liquid capable of efficient heat removal have been provided or proposed.

A liquid-cooled motor in which a cooling liquid is circulated through the laminated core of the stator has an advantage over an air-cooled motor in that the cooling medium is capable of a high heat removing efficiency, and thus the cooling medium cools the motor at high efficiency. Nevertheless, the liquid-cooled motor has a problem in that thermal distortion of the liquid-cooled motor occurs when the laminated core is subjected to the cooling effect of the cooling liquid during the operation of the liquid-cooled motor if the heat distribution in the laminated core and the peripheral parts is not uniform, and accordingly, the rotor will fail to rotate smoothly, and because of the resulting unsteady rotation, the rotor shaft is unable to apply a fixed torque to the driven object associated with the liquid-cooled motor.

DISCLOSURE OF THE INVENTION

Accordingly, it is an object of the present invention to provide a liquid-cooled motor provided with means for obviating the above-mentioned thermal distortion.

In view of the object of the invention, the present invention employs a configuration capable of a symmetrical distribution of the cooling effect in the laminated core with respect to the center axis thereof. That is, according to the present invention, a liquid-cooled motor having cooling liquid passages formed in the laminated core of the stator thereof, for directly cooling the laminated core with a cooling liquid, is characterized in that a plurality of the cooling liquid passages extend axially and are distributed, as viewed in cross section perpendicular to the axis, symmetrically with respect to the center axis in the laminated core of the stator having the shape of a hollow tube and surrounding the cylindrical rotor with a gap therebetween. Such an arrangement of the cooling liquid passages develops a cooling effect that will constantly maintain a uniform distribution of heat in the laminated core and the peripheral parts to obviate thermal distortion of the laminated core.

BEST MODE FOR CARRYING OUT THE INVENTION

Figure 1:
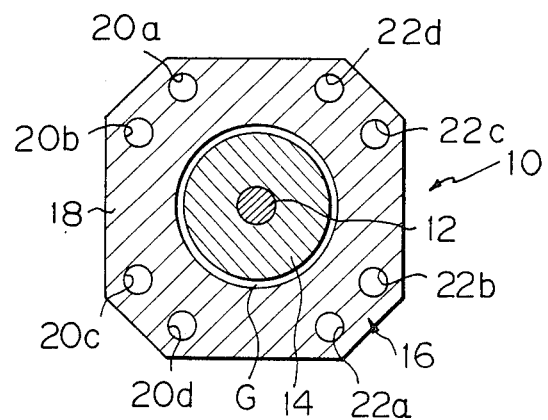
FIG. 1 is a sectional view showing a cross section perpendicular to the axis of a liquid-cooled motor having cooling liquid passages, embodying the present invention.

Referring to FIG. 1, a liquid-cooled motor 10 has a rotor 14 rotatably supported by a rotor shaft 12. The rotor 14 is a cylindrical body extending coaxially with the rotor shaft 12. The liquid-cooled motor 10 has a stator 16 surrounding the rotor 14 with a gap G therebetween. The stator 16 is a hollow tubular body receiving the rotor 14 therein. The stator 16 comprises a laminated core 18 and known stator coils, not shown, inserted in radial slots formed in the inner circumference of the laminated core 18. When an exciting current is supplied to the stator coils, the stator 16 generates a revolving magnetic field. The rotor 14 and the stator 16 form an AC motor that produces a torque by the agency of the mutual action between the revolving magnetic field of the stator 16 and the rotor 14.

Figure 3:
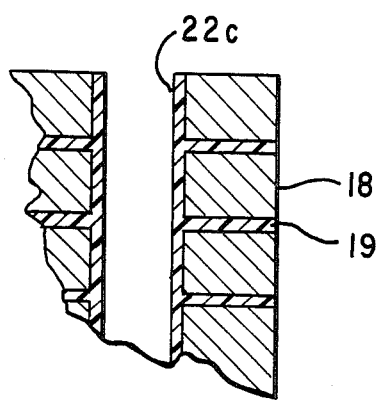
FIG. 3 is a partial cross-section through the motor stator showing in greater detail the lamination structure.

The laminated core 18 and the peripheral parts are heated by the heat of iron loss of the laminated core 18 and the heat of copper loss of the stator coils. Cooling liquid passages 20a, 20b, 20c, and 20d, and cooling liquid passages 22a, 22b, 22c, and 22d are formed in the laminated core 18 to cool the laminated core 18 with a cooling liquid. The cooling liquid passages 20a to 20d and the cooling liquid passages 22a to 22d are extended in parallel to the axis of the rotor shaft 12. The laminated core 18 is impregnated with a resin 19, as shown in FIG. 3, to fill gaps between the adjacent component thin laminations of the laminated core 18 and to coat the inner surfaces of the cooling liquid passages 20a to 20d and 22a to 22d with the resin so that the cooling liquid will flow through these cooling liquid passages without leakage. According to the present invention, a group of the cooling liquid passages 20a to 20d and a group of the cooling liquid passages 22a to 22d are disposed symmetrically with respect to the axis of the rotor shaft 12, which can be understood from FIG. 1. The cooling liquid passages 20a and 20b, the cooling liquid passages 20c and 20d, the cooling liquid passages 22a and 22b, and the cooling liquid passages 22c and 22d are pairs of inflow and outflow passages, respectively, formed in first, second, third and fourth corners of the laminated core 18, respectively. The four corners of the laminated core 18 are formed at regular intervals with respect to the axis of the rotor shaft 12. The cooling liquid is circulated through the groups of the cooling liquid passages, for example, through the cooling liquid passages 20a→20b→20c→20d for the group of the cooling liquid passages 20a to 20d and through the cooling liquid passages 22a→22b→20c→22d for the group of the cooling liquid passages 22a to 22d. To circulate the cooling liquid in such a manner, connecting passages for interconnecting the successive cooling liquid passages are formed in the laminated core 18 or the adjacent axial ends of the successive cooling liquid passages are interconnected with suitable pipes, respectively. When the cooling liquid is circulated through the cooling liquid passages 20a to 20d and the cooling liquid passages 22a to 22d during the operation of the motor 10, the cooling action of the cooling liquid is effected symmetrically with respect to the center of the rotor shaft 12 and accordingly, heat is distributed symmetrically with respect to the center of the rotor shaft 12 and uniformly in the laminated core 18. Accordingly, the thermal distortion of end housings, not shown in FIG. 1, respectively provided on the opposite axial ends of the laminated core 18 and the stator 16, and the peripheral parts thereof, can be prevented.

Figure 2:
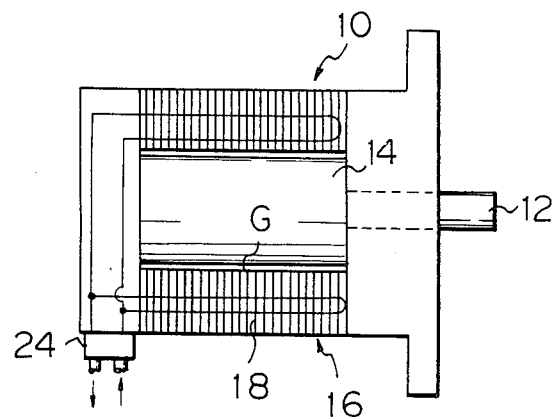
FIG. 2 is a schematic illustration showing a cooling liquid piping system of the liquid-cooled motor of FIG. 1.

FIG. 2 shows an exemplary piping system for circulating the cooling liquid in the foregoing manner. The cooling liquid supplied, for example, to the group of cooling liquid passages 20a to 20d through a header 24 provided on one end of the motor 10, for example, on the rear end of the motor 10, flows through the cooling liquid passages 20a to 20d in the foregoing sequence of the cooling liquid passages and is discharged outside the motor 10 through the header 24. Then, the outflowing cooling liquid is subjected to heat exchange and is cooled in an external cooling liquid passage, not shown, provided outside the motor 10, and the cooling liquid thus cooled is then supplied again to the cooling liquid passages. The distributed disposition of the cooling liquid passages shown in FIG. 1 is an example of the symmetrical disposition of the cooling liquid passages with respect to the center of the rotor shaft 12 and, naturally, the present invention is not limited to this embodiment.

For example, two cooling liquid passage systems may be formed by a group of the cooling liquid passages 20a, 20b, 22a and 22b and a group of the cooling liquid passages 20c, 20d, 22c and 22d, respectively. Furthermore, it will be readily understood that more than two cooling liquid passages may be provided in each corner of the stator 16 instead of providing two cooling liquid passages, namely, an inflow passage and an outflow passage, in each corner of the stator 16 as in the embodiment illustrated in FIG. 1.

Although the present invention has been described with reference to a preferred embodiment thereof, the present invention is not limited to such an embodiment, and many changes and variations are possible in the invention without departing from the scope of the invention delineated in the appended claims.

As is apparent from the foregoing description, according to the present invention, heat is distributed uniformly in the laminated core around the center axis of the same by developing the cooling effect symmetrically with respect to the center axis in the laminated core of the liquid-cooled motor. Thus, the present invention eliminates the possibility of thermal distortion of the laminated core and the peripheral parts and prevents unsteady rotation of the rotor shaft, and thereby improves the performance and useful life of the motor.

I claim:

1. A liquid-cooled motor comprising:
a cylindrical rotor;
a hollow tubular stator surrounding said rotor with a gap therebetween, said stator having an unjacketed laminated core composed of a plurality of laminations each having a plurality of holes formed therein so aligned as to form a plurality of cooling liquid passages extending axially with respect to said stator and distributed symmetrically with respect to an axis of said laminated core as viewed in cross section perpendicular to said axis, said cooling liquid passages being connected at a surface of said stator to external cooling liquid passages provided outside said hollow tubular stator; and
wherein said laminated core is impregnated with a resin to fill gaps between adjacent laminations and coat inner surfaces of said cooling liquid passages so that cooling liquid will flow through said cooling liquid passages without leakage therefrom.

2. A liquid-cooled motor according to claim 1, wherein said cooling liquid passages are distributed in the laminated core of said stator at four positions at regular intervals around said axis, as viewed in cross section peripendicular to said axis.

3. A liquid-cooled motor according to claim 2, wherein at least two cooling liquid passages, one for inflow and the other for outflow, are provided at each of said four positions.

* * * * *